United States Patent
Zhou et al.

(10) Patent No.: US 12,478,638 B2
(45) Date of Patent: *Nov. 25, 2025

(54) POLYMERS, COMPOSITIONS AND METHODS FOR TREATING HYPERURICEMIA

(71) Applicant: WATERSTONE PHARMACEUTICALS (WUHAN) CO., LTD., Wuhan (CN)

(72) Inventors: Youcheng Zhou, Wuhan (CN); Tongtong Li, Wuhan (CN); Minglong Hu, Wuhan (CN); Yan Li, Wuhan (CN); Kang Bie, Wuhan (CN); Ying Liang, Wuhan (CN); Jian Cui, Wuhan (CN); Faming Zhang, Wuhan (CN)

(73) Assignee: WATERSTONE PHARMACEUTICALS (WUHAN) CO., LTD., Hubei (CN)

( * ) Notice: Subject to any disclaimer, the term of this patent is extended or adjusted under 35 U.S.C. 154(b) by 796 days.

This patent is subject to a terminal disclaimer.

(21) Appl. No.: 17/826,803

(22) Filed: May 27, 2022

(65) Prior Publication Data

US 2023/0085942 A1 Mar. 23, 2023

Related U.S. Application Data

(63) Continuation of application No. PCT/CN2021/114309, filed on Aug. 24, 2021.

(51) Int. Cl.
| | | |
|---|---|---|
| *A61K 31/787* | (2006.01) | |
| *A61P 19/06* | (2006.01) | |
| *C08F 26/04* | (2006.01) | |

(52) U.S. Cl.
CPC ............ *A61K 31/787* (2013.01); *A61P 19/06* (2018.01); *C08F 26/04* (2013.01)

(58) Field of Classification Search
CPC ......... A61K 31/787; A61P 19/06; C08F 26/04
See application file for complete search history.

(56) References Cited

U.S. PATENT DOCUMENTS

| | | | | |
|---|---|---|---|---|
| 2002/0042395 A1* | 4/2002 | Hadvary | ............... | A61K 31/00 514/60 |
| 2002/0187120 A1* | 12/2002 | Holmes-Farley | .... | A61K 31/785 424/78.31 |
| 2003/0039627 A1* | 2/2003 | Holmes-Farley | ......... | A61P 3/00 424/78.35 |

FOREIGN PATENT DOCUMENTS

| | | |
|---|---|---|
| CN | 1503676 A | 6/2004 |
| CN | 1511039 A | 7/2004 |
| CN | 101043878 A | 9/2007 |
| WO | 2005032563 A1 | 4/2005 |

OTHER PUBLICATIONS https://www.chemscene.com/product/152751-57-0.html 2010 for CAS#152751-57-0 (Year: 2010).*
Draft Guidance on Colesevelam Hydrochloride Nov. 2021, Revision History: Recommended Aug. 2010; Revised Jun. 2011, Mar. 2012, Jun. 2013, Jan. 2016, Sep. 2019, Nov. 2021 Unique Agency Identifier: PSG_022362. (Year: 2010).*
International Search Report mailed on May 19, 2022 for corresponding application No. PCT/CN2021/114309.
Extended European Search Report issued on Jan. 2, 2023 for corresponding European Application No. 21870493.0.

* cited by examiner

*Primary Examiner* — Blessing M Fubara (57) ABSTRACT

The disclosure provides polymers and compositions thereof, as well as methods for preparing such polymers and compositions. Also provided is a method of using the polymers or compositions thereof for binding uric acid or precursor thereof, and/or for treating hyperuricemia, gout, and/or diseases caused by hyperuricemia.

13 Claims, 2 Drawing Sheets

POLYMERS, COMPOSITIONS AND METHODS FOR TREATING HYPERURICEMIA

CROSS-REFERENCE TO RELATED APPLICATIONS

The present application is a continuation of International Patent Application No. PCT/CN2021/114309, filed on Aug. 24, 2021, the entire content of which is incorporated herein by its reference.

FIELD

The present invention relates to polymers and compositions containing such polymers, and methods of using such polymers/compositions for binding uric acid and/or for treating hyperuricemia, gout, and/or diseases caused by hyperuricemia.

BACKGROUND

The prevalence of gout is approximately 1.3 to 3.7 percent of the general population. Individuals suffering from gout excrete approximately 40 percent less uric acid, the final breakdown product of purine degradation, than nongouty individuals for any given plasma urate concentrations. Hyperuricemia is formed when the uric acid metabolism of the human body is disturbed, resulting in excessive uric acid production or reduced excretion. The diagnostic index of hyperuricemia is usually that the female blood uric acid level is greater than 6 mg/dl (360 µM), and the male blood uric acid level is greater than 7 mg/dl (420 µM). The main clinical features of gout are hyperuricemia, recurrent acute and chronic attacks of gout caused by hyperuricemia, arthritis, joint deformities, uric acid urinary stones, which cause damage to the kidneys, cause interstitial nephritis, and renal failure.

Current treatments for gouty arthritis include colchicine, anti-inflammatory drugs, and intraarticular glucocorticoids. However, the most effective of these, colchicine administered orally cannot be tolerated by 80 percent of people because of side effects.

The invention relates to a treatment for gout in an individual with a polymer structurally defined in the claims that binds to uric acid or to a precursor thereof, such as purine. The invention is effective for both treatment and prevention of gout, hyperuricosuria, uric acid nephropathy. Polymers that bind uric acid may also have utility in lowering uric acid levels in a patient at risk of developing coronary heart disease.

Therefore, there exists a great deal of interest in developing new drugs for lowering uric acid and/or for treating hyperuricemia, gout, and/or diseases caused by hyperuricemia.

BRIEF SUMMARY

The present disclosure provides polymers and compositions thereof. Also provided are the use of the polymers and compositions described herein for the manufacture of a medicament for binding uric acid or urate, and/or the medicament for the treatment of hyperuricemia, gout, and/or diseases caused by hyperuricemia.

In one aspect, the present disclosure provides an amine polymer or a salt thereof comprising a first amine, wherein the first amine is linked to pyrimidine-2,4-diamine or an analog thereof. In some embodiments, the first amine is a primary amine, a secondary amine or tertiary amine. In some embodiments, the amine polymer comprises polyallylamine (PAA), polytriallylamine (TAA), polyvinylamine (PVA), polyethyleneimine (PET), chitosan or any combination thereof. In some embodiments, the analog is 4-N-(6-hexyl)pyrimidine-2,4,6-triamine. In some embodiments, the amine polymer is cross-linked by a crosslinking agent. In some embodiments, the crosslinking agent is epichlorohydrin.

In some embodiments, the amine polymer or a salt thereof further comprises a second amine, wherein the second amine is linked to a moiety characterized by selective adsorption of uric acid or precursor thereof. It is also contemplated that the amine polymer or a salt thereof can be characterized by two or more features recited herein.

In some embodiments, the amine polymer or a salt thereof comprises repeat units having at least two formulae selected from the group consisting of and a salt thereof, wherein a, b, c, d, e and f, when applicable, are each independently a positive integer.

In another aspect, provided herein is a composition comprising an amine polymer or a salt thereof, wherein the amine polymer comprises a first amine linked to pyrimidine-2,4-diamine or an analog thereof, and wherein the amine polymer is produced by (i) linking pyrimidine-2,4-diamine or an analog thereof to the first amine, and (ii) subsequently crosslinking by a crosslinking agent.

Also provided is a process of making a polyallylamine-based copolymer having a general structure of formula (4), (4)

wherein a, b, c, d, and e are each independently a positive integer, comprising (1) mixing polyallylamine with NaOH in an aqueous solution; (2) crosslinking the polyallylamine in the aqueous solution with epichlorohydrin to obtain a crosslinked polyallylamine; (3) grafting 4-N-(6-bromo-hexyl)-pyrimidine-2,4,6-triamine hydrobromide onto the crosslinked polyallylamine at an elevated temperature; and (4) further reacting 1-bromodecane and (6-bromohexyl) trimethylammonium bromide with the grafted polyallylamine at the elevated temperature to yield a polyallylamine-based copolymer in a mixture. Any composition comprising the polyallylamine-based copolymer produced by the process described herein is contemplated.

Also provided is a pharmaceutical composition comprising the amine polymer or a salt thereof (e.g., the polyallylamine-based copolymer) described herein; and a pharmaceutically acceptable excipient, diluent, or carrier.

Further provided is a method of treating a condition associated with an elevated serum uric acid level comprising administering to a subject in need thereof the amine polymer or a salt thereof/the polyallylamine-based copolymer or the pharmaceutical composition described herein. In some embodiments, the amine polymer or a salt thereof/the polyallylamine-based copolymer or the pharmaceutical composition is administered orally.

Other features and advantages will be apparent from the following description of the certain embodiments thereof and from the claims.

Other aspects of the present disclosure relate to a method for binding uric acid or precursor thereof, and thus lowering uric acid level in a subject in need. In some embodiments, the polymers and compositions described herein are used in a method for treating hyperuricemia, gout, and/or diseases caused by hyperuricemia.

DESCRIPTION OF THE DRAWINGS

The present application can be best understood by reference to the following description taken in conjunction with the accompanying figures included in the specification.

FIGS. 1a, 1b and 1c illustrate that in a rat model of hyperuricemia induced by adenine (100 mg/kg)+ethambutol (250 mg/kg), the compound 2 (PAA polymer) had significant uric acid (UA) lowering effect and could reduce CREA and UREA, indicating that compound 2 (PAA polymer) had a certain protective effect on kidney while lowering uric acid.

FIGS. 2a, 2b and 2c illustrate that in a rat model of hyperuricemia induced by 100 mg/kg adenine, 250 mg/kg ethambutol and 7.5 g/kg yeast powder, the compound 2 (PAA polymer) could significantly reduce UA, CREA and UREA, indicating that compound 2 (PAA polymer) had a certain protective effect on kidney while lowering uric acid.

DETAILED DESCRIPTION

The present disclosure is based on the inventors' discovery that certain polymers, and compositions thereof are effective at binding uric acid.

Unless defined otherwise, all scientific and technical terms are understood to have the same meaning as commonly used in the art to which they pertain. For the purpose of the present disclosure, the following terms are defined.

The term "about" as used herein refers to the usual error range for the respective value readily known to the skilled person in this technical field. Reference to "about" a value or parameter herein includes (and describes) embodiments that are directed to that value or parameter per se. For example, "about x" includes and describes "x" per se. In some embodiments, the term "about" when used in association with a measurement, or used to modify a value, a unit, a constant, or a range of values, refers to variations of +/−2%. As used herein and in the appended claims, the singular forms "a," "an," and "the" include plural reference unless the context clearly indicates otherwise.

The term "a derivative thereof" refers to a salt thereof, an ester thereof, a free acid form thereof, a free base form thereof, a solvate thereof, a deuterated derivative thereof, a hydrate thereof, an N-oxide thereof, a polymorph thereof, a stereoisomer thereof, a geometric isomer thereof, a tautomer thereof, a mixture of tautomers thereof, an enantiomer thereof, a diastereomer thereof, a racemate thereof, a mixture of stereoisomers thereof, an isotope thereof (e.g., tritium, deuterium), or a combination thereof.

In some embodiments, "treatment" or "treating" includes an approach for obtaining beneficial or desired results including clinical results. Beneficial or desired clinical results may include one or more of the following: a) inhibiting the disease or condition (e.g., decreasing one or more symptoms resulting from the disease or condition, and/or diminishing the extent of the disease or condition); b) slowing or arresting the development of one or more clinical symptoms associated with the disease or condition (e.g., stabilizing the disease or condition, preventing or delaying the worsening or progression of the disease or condition, and/or preventing or delaying the spread of the disease or condition); and/or c) relieving the disease, that is, causing the regression of clinical symptoms (e.g., ameliorating the disease state, providing partial or total remission of the disease or condition, enhancing effect of another medication, delaying the progression of the disease, increasing the quality of life, and/or prolonging survival.

In some variations, a "therapeutically effective amount" is at least the minimum concentration required to effect a measurable improvement of a particular disease, disorder, or condition, such as a congenital disorder of glycosylation. A therapeutically effective amount herein may vary according to factors such as the disease state, age, sex, and weight of the subject, and the ability of the compositions of the present disclosure to elicit a desired response in the subject. A therapeutically effective amount is also one in which any toxic or detrimental effects of the lipid compositions of the present disclosure are outweighed by the therapeutically beneficial effects.

Amine Polymers

Provided herein are polymers and compositions thereof, which may be useful in binding uric acid. Amine polymers and methods of making such amine polymers are described.

In some embodiments, an amine polymer comprises a first amine, wherein the first amine is linked to pyrimidine-2,4-diamine or an analog thereof. The first amine can be a primary amine, a secondary amine or tertiary amine. The amine polymer may include polyallylamine (PAA), polytriallylamine (TAA), polyvinylamine (PVA), polyethyleneimine (PEI), chitosan or any combination thereof.

In some embodiments, the first amine is linked to pyrimidine-2,4-diamine. In other embodiments, the first amine is linked to an analog, 4-N-(6-hexyl)pyrimidine-2,4,6-triamine.

The amine polymer can be cross-linked by a crosslinking agent. Suitable crosslinking agents include, but are not limited to, epichlorohydrin, 1,4-Butanediol diglycidyl ether, ethylene glycol diglycidyl ether, 1,3-dichloropropane, 1,2-dichloroethane, 1,3-dibromopropane, 1,2-dibromoethane, succinyl chloride and dimethyl succinate.

In some embodiments, the amine polymer further comprises a second amine, wherein the second amine is linked to a moiety characterized by selective adsorption of uric acid or precursor thereof. The moiety can be selected from the group consisting of a derivative thereof and any combination thereof. In some embodiments, both and are linked to the amine polymer in addition to 4-N-(6-hexyl)pyrimidine-2,4,6-triamine.

An amine polymer or a salt thereof comprises repeat units having at least two formulae selected from the group consisting of:

wherein a, b, c, d, e and f, when applicable, are each independently a positive integer. In some embodiments, the amine polymer or a salt thereof comprises at least three formulae selected from the group consisting of:

In some embodiments, the amine polymer or a salt thereof comprises three, four or five formulae selected from the group consisting of:

In some embodiments, the amine polymer a salt thereof has repeat units consisting of wherein the ratio of a:b:c is 0.52:0.1:0.28. In some embodiments, the amine polymer has a general structure of formula (1):

(1)

wherein a has a mole percentage of 0.52, b has a mole percentage of 0.1, and c has a mole percentage of 0.28.

In some embodiments, the amine polymer a salt thereof has repeat units consisting of and wherein the ratio of a:b:c is 0.45:0.1:0.35. In some embodiments, the amine polymer has a general structure of formula (2):

(2)

wherein a has a mole percentage of 0.45, b has a mole percentage of 0.1, and c has a mole percentage of 0.35.

In some embodiments, the amine polymer a salt thereof has repeat units consisting of

13

-continued and wherein the ratio of a:b:c:d:e is 0.22:0.1:0.28:0.15:0.15. In some embodiments, the amine polymer has a general structure of formula (3):

14

-continued wherein a has a mole percentage of 0.22, b has a mole percentage of 0.1, c has a mole percentage of 0.28, d has a mole percentage of 0.15, and e has a mole percentage of 0.15.

In some embodiments, the amine polymer a salt thereof has repeat units consisting of (3)

and wherein the ratio of a:b:c:d:e is 0.15:0.1:0.35:0.15:0.15. In some embodiments, the amine polymer has a general structure of formula (4):

(4)

wherein a has a mole percentage of 0.15, b has a mole percentage of 0.1, c has a mole percentage of 0.35, d has a mole percentage of 0.15, and e has a mole percentage of 0.15.

Also provided are methods of making such amine polymers. In some embodiments, the method comprises (i) linking pyrimidine-2,4-diamine or an analog thereof to the first amine, and (ii) subsequently crosslinking by a crosslinking agent. Any compositions comprising an amine polymer produced by the methods described herein are contemplated in the present disclosure.

In some embodiments, the amine polymer is a polyallylamine-based copolymer having a general structure of formula (4) as described herein. The method of making the polyallylamine-based copolymer comprises (1) mixing polyallylamine with NaOH in an aqueous solution; (2) crosslinking the polyallylamine in the aqueous solution with epichlorohydrin to obtain a crosslinked polyallylamine; (3) grafting 4-N-(6-bromo-hexyl)-pyrimidine-2,4,6-triamine hydrobromide onto the crosslinked polyallylamine at an elevated temperature; and (4) further reacting 1-bromodecane and (6-bromohexyl) trimethylammonium bromide with the grafted polyallylamine at the elevated temperature to yield a polyallylamine-based copolymer in a mixture.

In some embodiments, the elevated temperature in steps (3) and (4) is between 65° C. and 70° C. In some embodiments, the elevated temperature is about 65° C., 66° C., 67° C., 68° C. 69° C., or 70° C.

In some embodiments, the method further comprises (5) filtering the mixture to obtain a solid of the polyallylamine-based copolymer.

The amine polymer (e.g., polyallylamine-based copolymer) described here exhibits high adsorption of uric acid or precursor thereof. In some embodiments, the amine polymer is characterized by an average adsorption of uric acid in a range from about 0.1 mmol/g to about 10 mmol/g. In some embodiments, the average adsorption of uric acid is in a range from about 0.1 mmol/g to about 0.2 mmol/g, from about 0.2 mmol/g to about 0.5 mmol/g, from about 0.5 mmol/g to about 1 mmol/g, from 1 mmol/g to about 5 mmol/g, from about 5 mmol/g to about 10 mmol/g. In some embodiments, the average adsorption of uric acid is about 0.1 mmol/g, about 0.2 mmol/g, about 0.3 mmol/g, about 0.5 mmol/g, about 1 mmol/g, or about 2 mmol/g. The high adsorption of uric acid or precursor thereof can enable the administration of a low dose of the amine polymer or a composition comprising the amine polymer.

In some embodiments, amine polymer (e.g., polyallylamine-based copolymer) described here has an average particle size greater than 3 µm, e.g., D(0.01): 3 µm. It would be appreciated that the polymers described here do not degrade under the physiological conditions and are generally not absorbed from the gastro-intestinal tract.

Also provided are any compositions comprising the amine polymer (e.g., polyallylamine-based copolymer) produced by the methods described herein.

Pharmaceutical Compositions

Pharmaceutical compositions of the present disclosure contain polymers or compositions thereof as described herein, and appropriate carriers including, for example, pharmaceutically acceptable carriers or diluents.

In some embodiments, carriers include pharmaceutically acceptable carriers, excipients, or stabilizers that are non-toxic to the cell or subject being exposed thereto at the dosages and concentrations employed. Often the physiologically acceptable carrier is an aqueous pH buffered solution. Suitable physiologically acceptable carriers include, for example, buffers such as phosphate, citrate, and other organic acids; antioxidants including ascorbic acid; low molecular weight (less than about 10 residues) polypeptide; proteins, such as serum albumin, gelatin, or immunoglobulins; hydrophilic polymers such as polyvinylpyrrolidone; amino acids such as glycine, glutamine, asparagine, arginine or lysine; monosaccharides, disaccharides, and other carbohydrates including glucose, mannose, or dextrins; chelating agents such as EDTA; sugar alcohols such as mannitol or sorbitol; salt-forming counterions such as sodium; and/or nonionic surfactants such as TWEEN™, polyethylene glycol (PEG), and PLURONICS™.

Suitable formulations include, for example, solutions, injections, inhalants, microspheres, aerosols, gels, ointments, creams, lotions, powders, dry vesicular powders, tablets, and capsules. Pharmaceutical compositions can include, depending on the formulation desired, pharmaceutically-acceptable, non-toxic carriers of diluents, which are vehicles commonly used to formulate pharmaceutical compositions for animal or human administration. The diluent is selected so as not to affect the biological activity of the combination. Such diluents include, for example, distilled water, buffered water, physiological saline, PBS. Ringer's solution, dextrose solution, and Hank's solution. A pharmaceutical composition or formulation of the present disclosure can further include, for example, other carriers or non-toxic, nontherapeutic, nonimmunogenic stabilizers, and excipients. The compositions can also include additional substances to approximate physiological conditions, such as pH adjusting and buffering agents, toxicity adjusting agents, wetting agents and detergents. A pharmaceutical composition of the present disclosure can also include any of a variety of stabilizing agents, such as an antioxidant for example.

Pharmaceutical compositions of the present disclosure can be suitable for oral or intestinal administration. In some embodiments, the pharmaceutical compositions of are used (e.g., administered to a subject in need of treatment, such as a human individual) by oral administration. For oral administration, the active ingredient can be administered in solid dosage forms, such as capsules, tablets, and powders, or in liquid dosage forms, such as elixirs, syrups, and suspensions. Active component(s) can be encapsulated in gelatin capsules together with inactive ingredients and powdered carriers, such as glucose, lactose, sucrose, mannitol, starch, cellulose or cellulose derivatives, magnesium stearate, stearic acid, sodium saccharin, talcum, magnesium carbonate. Examples of additional inactive ingredients that may be added to provide desirable color, taste, stability, buffering capacity, dispersion or other known desirable features are red iron oxide, silica gel, sodium lauryl sulfate, titanium dioxide, and edible white ink. Similar diluents can be used to make compressed tablets. Both tablets and capsules can be manufactured as sustained release products to provide for continuous release of medication over a period of hours. Compressed tablets can be sugar coated or film coated to mask any unpleasant taste and protect the tablet from the atmosphere, or enteric-coated for selective disintegration in the gastrointestinal tract. Liquid dosage forms for oral administration can contain coloring and flavoring to increase patient acceptance.

Dosages and desired concentration of pharmaceutical compositions of the present disclosure may vary depending on the particular use envisioned. The determination of the appropriate dosage or route of administration is well within the skill of an ordinary artisan. Animal experiments provide reliable guidance for the determination of effective doses for human therapy. For in vivo administration of any of the compositions of the present disclosure, normal dosage amounts may vary from 10 ng/kg up to 100 mg/kg of a subject's body weight per day.

Administration of a composition of the present disclosure can be continuous or intermittent, depending, for example, on the recipient's physiological condition, whether the purpose of the administration is therapeutic or prophylactic, and other factors known to skilled practitioners. It is within the scope of the present disclosure that dosages may be administered by one or more separate administrations, or by continuous infusion. For repeated administrations over several days or longer, depending on the condition, the treatment is sustained until a desired suppression of disease symptoms occurs. However, other dosage regimens may be useful. The progress of this therapy is easily monitored by conventional techniques and assays.

Thus, in some variations, the compositions provided herein may be chronically or intermittently administered to a subject (including, for example, a human) in need thereof. In certain variations, chronic administration is administration of the medicament(s) in a continuous as opposed to acute mode, so as to maintain the initial therapeutic effect (activity) for an extended period of time. In certain variations, intermittent administration is treatment that is not consecutively done without interruption, but rather is cyclic in nature.

Therapeutic Uses

The polymers and compositions described herein can bind to uric acid or precursor thereof. Provided is a method of treating hyperuricemia, gout, and/or diseases caused by hyperuricemia comprising administering the polymers or compositions described herein to a subject in need thereof. The subject can be a mammal. In one embodiment, the subject is a human.

In some embodiments, a method of treating a condition associated with an elevated serum uric acid level comprises administering the polymers or compositions described hereinto a subject in need thereof. The subject's serum uric acid level is lowered after the treatment as compared to the serum uric acid level before the treatment.

In some embodiments, the condition is hyperuricemia or gout. The gout can be server, chronic or acute. In some embodiments, the condition is a disease caused by hyperuricemia. In some embodiments, a method of treating chronic gouty arthritis, uric acid nephropathy, or stone disease comprises administering the polymers or compositions described hereinto a subject in need thereof.

Uric acid is naturally synthesized by xanthine oxidase-catalyzed oxidation of hypoxanthine and xanthine. Accordingly, in some embodiments, the polymers or compositions described herein are administered with a uric acid synthesis inhibitor such as a xanthine oxidase inhibitor. In one embodiment, the xanthine oxidase inhibitor is allopurinol. In another embodiment, the polymers or compositions described herein are administered with a uricosuric agent, which can act directly on the renal tubules to increase excretion of uric acid. In yet another embodiment, additional ingredients, for example, nonsteroidal anti-inflammatory drugs such as colchicine, ingredients for treating other related indications can be administered simultaneously or sequentially with the polymers or compositions described herein.

EXAMPLES

The following Examples are merely illustrative and is not meant to limit any aspects of the present disclosure in any way.

Below are exemplary reaction schemes for making some polymers described herein. The synthesis is illustrated in Examples 1-4.

Scheme 1

Scheme 2

21                                           22

-continued

Scheme 3

PAA·HCl     ECH

-continued

Scheme 4

Example 1

To a 1 L round bottom flask was added 400 mL water and NaOH (60.8 g), stir to dissolve, add Conc.50% PAA (400.0 g), stir for 10 min. Concentrate the solution at an external temperature 50-60° C. Add 400 mL water during the concentration process, and concentrate the solution to about 560.8 g. Add 2,4-diamino-6-chloropyrimidine (108.2 g) and 500 g water into a 2 L round bottom flask, stir and heat to about 100° C., and add the concentrated PAA solution the previous step prepared, then reflux for 72 h. Cool the reaction mixture to room temperature, Extract the mixture with 500 mL EA, repeat the extraction 3 times. Separate the aqueous layer into a flask, add Epichlorohydrin (19.8 g), stir the reaction and dropwise 60.0 g Conc.50% NaOH(aq.), heat the reaction to 45-55° C. Stop stirring after the reaction mixture was gelled, keep the temperature at 45-55° C. for 12 h. Crush the crosslinked polymer, slurry the particles with methanol once, rinse the particles with water and then suspending it in water. Adjust the pH of the mixture to 2-3 with dropwise Conc.HCl, filter the mixture after stir for a moment, rinse the solid until the conductivity of the filter liquor below 200 us/cm. Dry the wet product at 55-60° C. for 48 h, crush the product and a yellow solid was obtained.

Example 2

To a 2 L round bottom flask was added 1.0 L methanol and NaOH (17.5 g), stir to dissolve. Add the solid (50.0 g) that the product of example 1 prepared, 18.0 g 1-bromodecane and 24.5 g (6-bromohexyl) trimethylammonium bromide. Heat to 65-70° C. and reflux for 48-72 h. Filter the reaction, rinse it with 500 mL methanol. Slurry the solid in 500 mL 2M NaCl (aqueous) for 1 h, then filter the mixture, and repeat the operation 2-3 times. Suspending the solid in water, adjust the pH of the mixture to 2-3 with dropwise Conc.HCl, filter the mixture after stir for a moment, rinse the solid until the conductivity of the filter liquor below 200 us/cm. Dry the wet product at 55-60° C. for 48 h, crush the product and a yellow solid was obtained.

Example 3

To a 250 mL flask was added 20.0 g water and 1.0 g NaOH, stir to dissolve, then add 25.0 g Conc.40% PAA aqueous (Conc.50% PAAH free with NaOH, and dilute to 40% with water). Added Epichlorohydrin (0.9 g), stir and heat to 50-60° C., continue keep temperature at 50-60° C. for 4-6 h after the reaction was gelled. The polymer gel was removed and placed into a homogenizer, stir for 15 min, then filter the mixture and the wet solid was standby application. Dissolve N-(6-Bromo-hexyl)-pyrimidine-2,4,6-triamine Hydrobromide (the amount was calculated according to the assay of the wet product) in 10V methanol. Add NaHCO₃ into the solution slowly, filter the mixture after stir for 1 h, the filter liquor was standby application. Charge the filter liquor and the wet solid in a flask, stir and heat to 65-70° C., reflux for 48-72 h. Filter the mixture, rinse the wet cake with 200 mL methanol. Suspending the solid in 200 mL 2M NaCl (aqueous) for 1 h, then filter the mixture, and repeat the operation 2-3 times, rinse the solid until the conductivity of the filter liquor below 200 us/cm. Suspending the solid in water, adjust the pH of the mixture to about 13.0 with dropwise Conc.20% NaOH(aqueous). Bubble the suspension mixture with $CO_2$ until the pH reached about 10.0. Then stir for 0.5 h at room temperature, filter the mixture and rinse the solid until the conductivity of the filter liquor below 200 us/cm. Dry the wet product at 55-60° C. for 48 h, crush the product and a yellow solid was obtained.

Example 4

To a 250 mL flask was added 20.0 g water and 1.0 g NaOH, stir to dissolve, then add 25.0 g Conc.40% PAA aqueous (Conc.50% PAAH free with NaOH, and dilute to 40% with water). Added Epichlorohydrin (0.9 g), stir and heat to 50-60° C., continue keep temperature at 50-60° C. for 4-6 h after the reaction was gelled. The polymer gel was removed and placed into a homogenizer, stir for 15 min, then filter the mixture and the wet solid was standby application. Dissolve N-(6-Bromo-hexyl)-pyrimidine-2,4,6-triamine Hydrobromide (the amount was calculated according to the assay of the wet product) in 10V methanol. Add NaHCO₃ into the solution slowly, filter the mixture after stir for 1 h, the filter liquor was standby application. Charge the filter liquor and the wet solid in a flask, stir and heat to 65-70° C., reflux for 48-72 h. Filter the mixture, rinse the wet cake with 200 mL methanol. To a 500 mL round bottom flask was added 250 mL methanol and NaOH (1.0 g), stir to dissolve.

Add the wet solid, 3.2 g 1-bromodecane and 4.3 g (6-bromohexyl) trimethylammonium bromide. Heat to 65-70° C. and reflux for 48-72 h. Filter the reaction, rinse it with 200 mL methanol. Slurry the solid in 200 mL 2M NaCl (aqueous) for 1 h, then filter the mixture, and repeat the operation 2-3 times, rinse the solid until the conductivity of the filter liquor below 200 us/cm. Suspending the solid in water, adjust the pH of the mixture to about 13.0 with dropwise Conc.20% NaOH(aqueous). Bubble the suspension mixture with $CO_2$ until the pH reached about 10.0. Then stir for 0.5 h at room temperature, filter the mixture and rinse the solid until the conductivity of the filter liquor below 200 us/cm. Dry the wet product at 55-60° C. for 48 h, crush the product and a yellow solid was obtained.

Example 5

Solutions were prepared as follows:

Diluent: water.

Blank solution: same as diluent.

Phosphate buffer (pH6.8) was composed of the following: $KH_2PO_4$ 0.68 g/L, 0.24 g/L $NaHCO_3$, 0.32 g/L NaOH, and adjust pH to 6.8 with phosphoric acid.

Uric acid solution (2.1 mmol/L): uric acid (353 mg) was dissolved into 1 L Phosphate buffer pH6.8.

Linear stock solution: accurately take 5 ml of Uric acid solution (2.1 mmol/L) to a 50 ml volumetric flask, dilute to volume with sample solution, and mix.

Standard Linear solution: identify five 10 ml volumetric flasks by the numbers 1, 2, 3, 4, and 5. In that order pipet into the flasks 1, 3, 5, 8, and 10 ml respectively, of Linear stock solution. Dilute with water to volume, and mix.

Sample solution: Take about 100 mg of polymer sample, place it in a 250 ml Erlenmeyer flask, add 100 ml of uric acid binding solution, water bath at 37° C.±2° C., stir with magnet for 2 h, shake evenly, measure the solution and filter, precise measurement continued 1 ml of filtrate, put in a 10 ml measuring flask, and dilute to the mark with water.

The chromatographic system used is described below.

| Chromatographic system | |
|---|---|
| HPLC | Agilent 1260 or equivalent |
| Column | ACE Excel 5 C8, 4.6 mm × 150 mm, 5 μm |
| Detection wavelength | 293 nm, no reference |
| Flow rate | 1.0 ml/min |
| Column temperature | 30° C. |
| Injection volume | 10 μl |
| Run time | 8 min |
| Mobile phase | A: 0.05% phosphoric acid solution (Take 0.5 ml phosphoric acid, add 1 L purified water, and mix.) B: Methanol |
| Isocratic elution | mobile phase A- mobile phase B (95:5) |

A blank solution, a standard linear solution and a sample solution were injected respectively.

Blank solution should have no interference with uric acid impurity peak. On ruled coordinate paper, plot the observed instrument readings as the ordinate, and the concentrations, in μmol per liter, of uric acid as the abscissa. The linear correlation coefficient should not be less than 0.999.

Uric acid adsorbed on the polymers was calculated by the formula:

$$\frac{(C_0 - C1) \times V}{W}$$

in which $C_0$ is the concentration, in μmol per lite, of uric acid in 100 mL of uric acid solution (2.1 mmol/L) before exchange; $C_1$ is the concentration remaining after adsorption in μmol per liter, V is 100 ml; and W is the weight, in gram, of polymers taken, expressed on the anhydrous basis.

To eight 250 mL round bottom flask were added 80 mL methanol and (0.35 g, 0.7 g, 1.05 g, 1.4 g, 1.75 g, 2.1 g, 2.45 g, 2.7 g) NaOH respectively, cool to 0-10° C. after the NaOH was dissolved. Add 4-N-(6-Bromo-hexyl)-pyrimidine-2,4,6-triamine hydrobromide (2.69 g(0.1 eq), 5.38 g(0.2 eq), 8.07 g(0.3 eq), 10.76 g(0.4 eq), 13.45 g(0.5 eq), 16.14 g(0.6 eq), 18.83 g(0.7 eq), and 21.52 g(0.8 eq)) into the flask respectively, stir at 0-10° C. for 0.5-1 h. Add the polymers described herein, purge the flask with nitrogen and slight nitrogen protection. Heat to 65-70° C., reflux for 24-48 h. Cool the reaction to 30-40° C., filter the mixture and rinse the wet solid with 20 mL methanol. Slurry the wet solid in 80 mL methanol, stir at 30-40° C. for 0.5-1 h, filter the mixture and rinse the wet solid with 20 mL methanol, repeat the slurry operation once. Suspending the wet solid in 100 mL 8% $NaHCO_3$, stir at 35-40° C. for 0.5-1 h, filter the mixture and rinse the wet solid with 20 mL water, repeat the slurry operation 5 times. Suspending the wet solid in 100 mL water, stir at 25-35° C. for 0.5-1 h, filter the mixture and rinse the wet solid with 20 mL water, repeat the slurry operation 2 times. Rinse the wet cake with water until the pH of the filter liquor reach about 7, the conductivity of the filter liquor below 100 us/cm. Dry the wet solid at 40-50° C. for 24-36 h under vacuum.

Example 6

40 rats were randomly divided into 5 groups with 8 rats in each group. The groups were as follows: Blank Group (Vehicle, ig); Model Group (Vehicle, ig); Positive control group (Allopurinol, 10 mg/kg, ig); Compound 1 group (Sevelamer carbonate, 250 mg/kg, ig); Compound 2 group (PAA polymer, 50 mg/kg, ig). Except for Blank group, rats in other groups were modeled according to the chronic modeling method. The modeling method was as follows: rats were given Adenine (100 mg/kg)+Ethambutol (250 mg/kg) by gavage, once a day, for 21 days. Animals in blank group and model group were given equal volume of normal saline by gavage. Animals in positive control group were given 10 mg/kg Alloalcohol by gavage, once in the first week, once in the second week, once a day for 3 days before sampling in the third week. Animals in each group were given intragastric administration once a day for 14 consecutive days from the 8th day of modeling. Blood samples were taken at Day 21 after modeling, and serum samples were separated and stored at −80□ for biochemical detection.

Figure 1A:
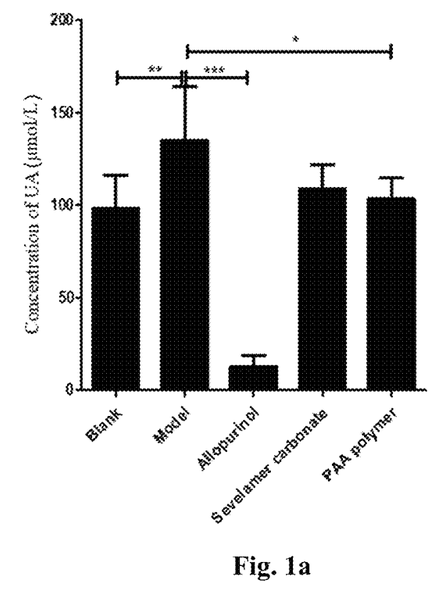
FIG. 1a shows the level of uric acid (UA)
Figure 1B:
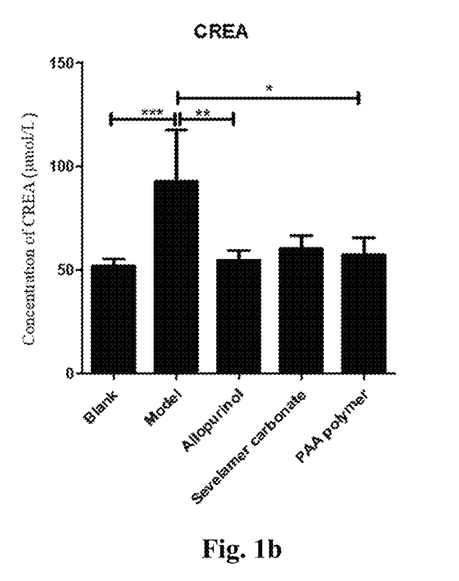
FIG. 1b shows the level of creatinine (CREA) and FIG. 1c shows the level of urea (UREA).
Figure 1C:
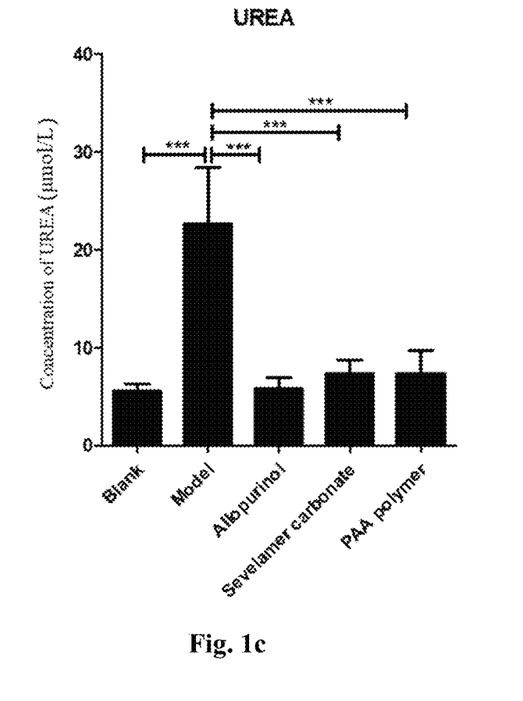

After 21 days of modeling (14 days of drug treatment), blood samples were taken and serum separation was performed to detect three renal functions (UA, CREA and UREA) (See Table 1 and FIGS. 1a to 1c). Compound 1 is Sevelamer carbonate and Compound 2 is a polyallylamine-based copolymer having a general structure of formula (4) as described herein.

TABLE 1

Biochemical results after 21 days of modeling (14 days of administration)

| Group | Test Article | Dose (mg/kg) | UA (μmol/L) | CREA (μmol/L) | UREA (mmol/L) |
|---|---|---|---|---|---|
| Blank | Vehicle | — | 98.18 ± 18.08 | 52.01 ± 3.22 | 5.57 ± 0.75 |
| Model | Vehicle | — | 135.00 ± 28.91** | 92.62 ± 24.80*** | 22.64 ± 5.77*** |
| Positive | Allopurinol | 10 | 12.88 ± 6.01### | 54.73 ± 4.75## | 5.82 ± 1.10### |
| Compound 1 | Sevelamer carbonate | 250 | 108.80 ± 12.99 | 60.41 ± 6.15 | 7.37 ± 1.39### |
| Compound 2 | PAA polymer | 50 | 103.30 ± 11.38# | 57.42 ± 8.01# | 7.36 ± 2.36### |

Compared with blank group, *$P < 0.05$, $P < 0.01$, *$P < 0.001$; compared with model group, #$P < 0.05$, ##$P < 0.01$, ###$P < 0.001$.

It was found that after 21 days of modeling, compared with the blank group, the levels of UA, CREA and UREA in the model group were significantly increased (P<0.01, P<0.001, P<0.001, respectively). Compared with the model group, the levels of UA, CREA and UREA in the positive control (Allopurinol) group were significantly reduced (P<0.001, P<0.01, P<0.001, respectively), the level of UREA in Compound 1 (Sevelamer carbonate) group was significantly decreased (P<0.001), and the levels of UA, CREA and UREA in the compound 2 group were also significantly reduced (P<0.05, P<0.05, P<0.001, respectively).

In conclusion, in a rat model of hyperuricemia induced by adenine (100 mg/kg)+ethambutol (250 mg/kg), the compound 2 (PAA polymer) had significant uric acid (UA) lowering effect and could reduce CREA and UREA, indicating that compound 2 (PAA polymer) had a certain protective effect on kidney while lowering uric acid.

Example 7

32 rats were randomly divided into 4 groups with 8 rats in each group. The groups were as follows: Blank Group (Vehicle, ig); Model Group (Vehicle, ig); Compound 1 group (Sevelamer carbonate, 100 mg/kg, ig); Compound 2 group (PAA polymer, 100 mg/kg, ig). Except for blank group, rats in other groups were modeled according to the chronic modeling method. The modeling method was as follows: 100 mg/kg adenine+250 mg/kg ethambutol+7.5 g/kg yeast powder were given to rats by gavage, once a day, for 21 days. Animals in blank group and model group were given equal volume of normal saline by gavage. Animals in each group were given intragastric administration once a day for 14 consecutive days from the 8th day of modeling. Blood samples were taken at Day 21 after modeling, and serum samples were separated and stored at −80□. for biochemical detection.

Figure 2A:
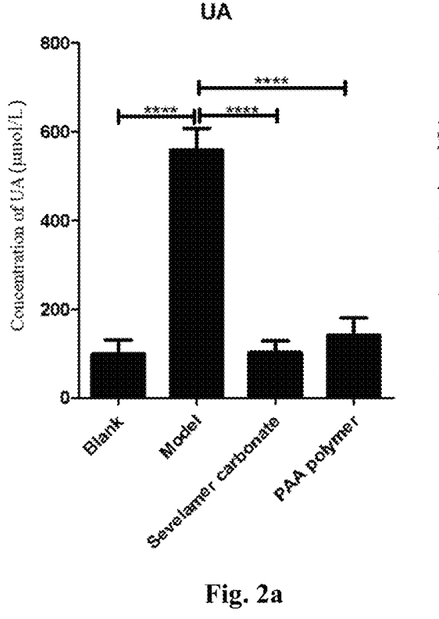
FIG. 2a shows the level of UA.
Figure 2B:
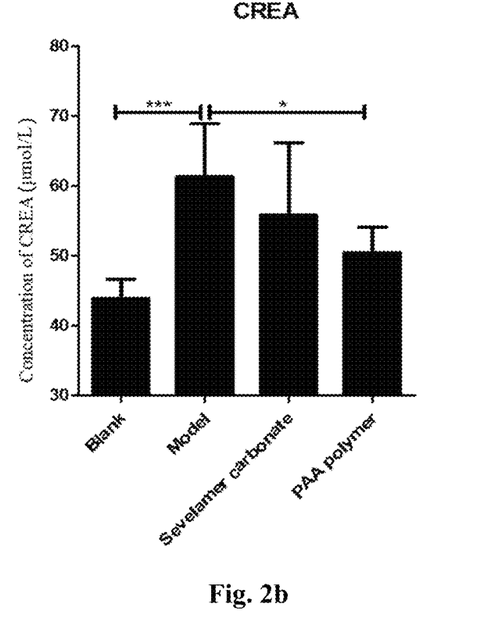
FIG. 2b shows the level of CREA and FIG. 2c shows the level of UREA.
Figure 2C:
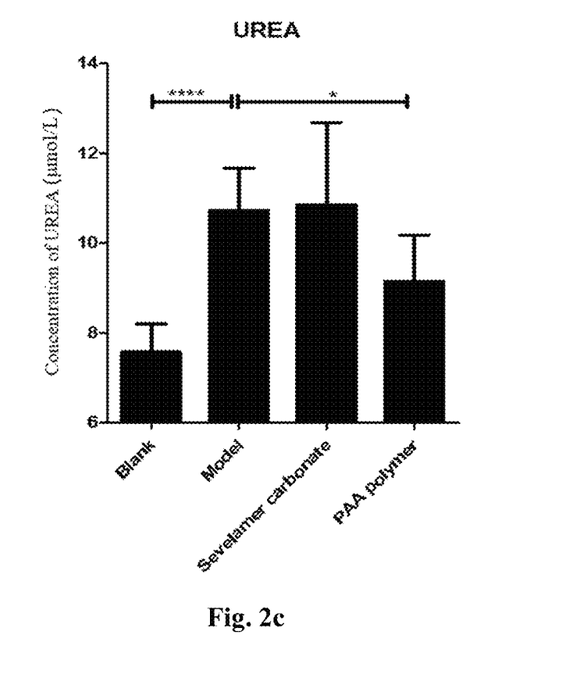

After 21 days of modeling (14 days of drug treatment), blood samples were collected and serum samples were separated to detect three renal functions (UA, CREA and UREA). (See Table 2 and FIGS. 2a to 2c).

TABLE 2

Biochemical results after 21 days of modeling (14 days of administration)

| Group | Test Article | Dose (mg/kg) | UA (μmol/L) | CREA (μmol/L) | UREA (mmol/L) |
|---|---|---|---|---|---|
| Blank | Vehicle | — | 99.67 ± 30.92 | 43.89 ± 2.78 | 7.57 ± 0.63 |
| Model | Vehicle | — | 558.70 ± 48.91*** | 61.34 ± 7.54*** | 10.73 ± 0.94*** |
| Compound 1 | Sevelamer carbonate | 100 | 102.40 ± 26.04### | 55.87 ± 10.34 | 10.85 ± 1.84 |
| Compound 2 | PAA polymer | 100 | 141.70 ± 39.44### | 50.43 ± 3.70# | 9.15 ± 1.03# |

Compared with blank group, *$P < 0.05$, $P < 0.01$, *$P < 0.001$; compared with model group, #$P < 0.05$, ##$P < 0.01$, ###$P < 0.001$.

Compared with the blank group, UA, UREA, and CREA in model group increased significantly (P<0.0001, P<0.0001, P<0.0001). Compared with the model group, the level of UA in compound 1 (Sevelamer carbonate) group was significantly decreased (P<0.0001), the levels of UA. UREA, and CREA in Compound 2 (PAA polymer) group were significantly decreased (P<0.001, P<0.05, P<0.05).

In conclusion, in a rat model of hyperuricemia induced by 100 mg/kg adenine, 250 mg/kg ethambutol and 7.5 g/kg yeast powder, the compound 2 (PAA polymer) could significantly reduce UA, CREA and UREA, indicating that compound 2 (PAA polymer) had a certain protective effect on kidney while lowering uric acid.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled. Such modifications are intended to fall within the scope of the appended claims.

All references, patent and non-patent, cited herein are incorporated herein by reference in their entireties and for all purposes to the same extent as if each individual publication or patent or patent application was specifically and individually indicated to be incorporated by reference in its entirety for all purposes.

What is claimed is:

1. An amine polymer or a salt thereof comprising a first amine, wherein the first amine is linked to pyrimidine-2,4-diamine or an analog thereof.

2. The amine polymer or a salt thereof of claim 1, wherein the first amine is a primary amine, a secondary amine or tertiary amine.

3. The amine polymer or a salt thereof of claim 1, wherein the amine polymer comprises polyallylamine (PAA), polytriallylamine (TAA), polyvinylamine (PVA), polyethyleneimine (PEI), chitosan or any combination thereof.

4. The amine polymer or a salt thereof of claim 1, wherein the analog is 4-N-(6-hexyl)pyrimidine-2,4,6-triamine.

5. The amine polymer or a salt thereof of claim 1, wherein the amine polymer is cross-linked by a crosslinking agent, and preferably, the crosslinking agent is epichlorohydrin.

6. The amine polymer or a salt thereof of claim 1, further comprising a second amine, wherein the second amine is linked to a moiety characterized by selective adsorption of uric acid or precursor thereof.

7. The amine polymer or a salt thereof of claim 6, wherein the moiety is selected from the group consisting of a derivative thereof and any combination thereof.

8. A composition comprising an amine polymer or a salt thereof of claim 1,
wherein the amine polymer comprises a first amine linked to pyrimidine-2,4-diamine or an analog thereof, and wherein the amine polymer is produced by
(i) linking pyrimidine-2,4-diamine or an analog thereof to the first amine, and
(ii) subsequently crosslinking by a crosslinking agent.

9. The amine polymer or a salt thereof of claim 1, comprising repeat units, wherein the repeat units are -continued and wherein the ratio of a:b:c:d:e is
0.15:0.1:0.35:0.15:0.15.

10. A pharmaceutical composition comprising
an amine polymer or a salt thereof of any one of claim 1; and
a pharmaceutically acceptable excipient, diluent, or carrier.

11. A method of treating a condition associated with an elevated serum uric acid level, comprising administering to a subject in need thereof the pharmaceutical composition of claim 10.

12. A method of treating a condition associated with an elevated serum uric acid level, comprising administering to a subject in need thereof the amine polymer or the salt thereof of claim 1.

13. The method of claim 12, wherein the amine polymer binds to uric acid or precursor thereof; and/or
said condition is hyperuricemia or gout, and said gout is severe gout, chronic gout, or acute gout; and/or
the amine polymer or the salt thereof is administered orally.

* * * * *